(12) United States Patent
Rose et al.

(10) Patent No.: US 11,270,376 B1
(45) Date of Patent: Mar. 8, 2022

(54) METHOD AND SYSTEM FOR ENHANCING MODELING FOR CREDIT RISK SCORES

(71) Applicant: Vantagescore Solutions, LLC, Stamford, CT (US)

(72) Inventors: Nicholas Andrew Rose, Naperville, IL (US); Andrada Ioana Pacheco, Danbury, CT (US)

(73) Assignee: Vantagescore Solutions, LLC, Stamford, CT (US)

( * ) Notice: Subject to any disclaimer, the term of this patent is extended or adjusted under 35 U.S.C. 154(b) by 0 days.

(21) Appl. No.: 15/952,468

(22) Filed: Apr. 13, 2018

Related U.S. Application Data

(60) Provisional application No. 62/485,585, filed on Apr. 14, 2017.

(51) Int. Cl.
*G06Q 40/02* (2012.01)
*G06Q 10/06* (2012.01)

(52) U.S. Cl.
CPC ......... *G06Q 40/025* (2013.01); *G06Q 10/067* (2013.01)

(58) Field of Classification Search
CPC ...... G06Q 40/02; G06Q 40/025; G06Q 40/00; G06Q 30/02; G06Q 40/08; G06Q 40/06; G06Q 10/0635; G06Q 20/4016; G06Q 30/0201; G06Q 30/0609
USPC ... 705/7.24, 26.2, 30, 34, 35, 36 R, 38, 306; 706/11; 707/757; 715/739; 345/581; 1/1
See application file for complete search history.

(56) References Cited

U.S. PATENT DOCUMENTS

| | | | |
|---|---|---|---|
| 2005/0096950 A1* | 5/2005 | Caplan | G06Q 10/06314 705/7.24 |
| 2006/0267999 A1* | 11/2006 | Cash | G06Q 40/02 345/581 |
| 2006/0293979 A1* | 12/2006 | Cash | G06Q 20/4016 705/34 |
| 2008/0027841 A1* | 1/2008 | Eder | G06Q 40/00 705/35 |
| 2008/0294996 A1* | 11/2008 | Hunt | G06Q 30/02 715/739 |
| 2009/0018996 A1* | 1/2009 | Hunt | G06F 16/2264 |
| 2009/0222375 A1* | 9/2009 | Choudhuri | G06Q 40/08 705/38 |
| 2009/0222377 A1* | 9/2009 | Choudhuri | G06Q 40/025 705/38 |
| 2009/0222379 A1* | 9/2009 | Choudhuri | G06Q 40/025 705/38 |
| 2009/0299911 A1* | 12/2009 | Abrahams | G06Q 40/00 705/36 R |
| 2010/0223211 A1* | 9/2010 | Johnson | G06Q 40/00 706/11 |

(Continued)

*Primary Examiner* — Alexander G Kalinowski
*Assistant Examiner* — Sanjeev Malhotra
(74) *Attorney, Agent, or Firm* — Smith Gambrell & Russell LLP

(57) ABSTRACT

The system and method of the present invention expand/enhance modeling for credit risks scores. The expanded modeling system and methods discussed herein identify new credit risk related attributes using limited and/or unconventional credit data. In an aspect, the system and method enhance performance definitions to capture incremental insight, expanding the applicable consumer segments previously inaccessible.

21 Claims, 11 Drawing Sheets

(56) References Cited

U.S. PATENT DOCUMENTS

| | | | |
|---|---|---|---|
| 2011/0137924 A1* | 6/2011 | Hunt | G06F 16/2453 707/757 |
| 2012/0036055 A1* | 2/2012 | Morris | G06Q 40/02 705/35 |
| 2012/0246048 A1* | 9/2012 | Cohen | G06Q 40/00 705/35 |
| 2013/0317954 A1* | 11/2013 | Psota | G06Q 40/02 705/30 |
| 2014/0019333 A1* | 1/2014 | Morris | G06Q 40/025 705/38 |
| 2014/0081835 A1* | 3/2014 | Choudhuri | G06Q 40/08 705/38 |
| 2015/0073929 A1* | 3/2015 | Psota | G06Q 30/0605 705/26.2 |
| 2015/0112874 A1* | 4/2015 | Serio | G06Q 30/0278 705/306 |
| 2016/0224996 A1* | 8/2016 | Hunt | G06F 16/283 |
| 2017/0323358 A1* | 11/2017 | Psota | G06Q 10/083 |
| 2018/0285886 A1* | 10/2018 | Yan | G06N 20/00 |

\* cited by examiner

Available Trades

| Consumers with: | | Exist | New | Post |
|---|---|---|---|---|
| | New Trades Only | | 2394 | |
| | Existing Trades Only | 18536 | | |
| | New & Exist Only | 765 | 516 | |
| No upd last6 | Post 3 Mos Only | | | 68556 |
| | New & Post Only | | 4085 | 10056 |
| | Exist & Post Only | 11709 | | 17172 |
| | All 3 | 1732 | 1269 | 3296 |
| | Total | 32742 | 8264 | 99080 |
| | New & Existing | | 41006 | |

FIG. 3

| Node # | Node | Bad Rate | Volume |
|---|---|---|---|
| NODE_13_118 | Med Coll Bal 0-160 or Legal = 1 | 26.6% | 5918 |
| NODE_7_133 | Months Non-Med 45-57 or Months Inquiry >= 19 | 27.6% | 3558 |
| NODE_7_54 | Med Bal 0-160 or Inquiry 6-12 Months | 21.6% | 1699 |
| NODE_3_122 | Non-Med bal 1427-242337 or retail inquiry > 10 months | 31.6% | 894 |

| NAME | NODE DESCRIPTION |
|---|---|
| NODE_1_85 | If COLLEXT_BAL is greater than or equal to 200 and is less than 788 and MONTHS_REPORTED is greater than or equal to 6 and is less than or equal to 11 and AVAILABLE_CREDIT_AMT is greater than or equal to 0 and is less than 500 then There is a 73.6567 percent chance that aaa_mod_var will be 0 and a 26.3433 percent chance that aaa_mod_var will be 1. |
| NODE_1_12 | If MAX_RATE is equal to 0 and COLLEXT_BAL is greater than or equal to 0 and is less than 88 and NUM_INQ is greater than or equal to 2 and is less than or equal to 6 then There is a 73.6567 percent chance that aaa_mod_var will be 0 and a 26.3433 percent chance that aaa_mod_var will be 1. |
| NODE_1_99 | If MAX_RATE is equal to 0 and COLLEXT_BAL is greater than or equal to 0 and is less than 88 and NUM_INQ is less than or equal to 1 then There is a 73.1132 percent chance that aaa_mod_var will be 0 and a 26.8868 percent chance that aaa_mod_var will be 1. |

Medical Collection Accounts - Unpaid, > 6 months age

| Balance$ | Age | Number of Inquiries | | |
|---|---|---|---|---|
| | | 1 | 2 | 3+ |
| <=1000 | 7-12 mos | 32.6% | | |
| | 12-36 mos | 30.4% | | |
| | 36+ mos | 27.7% | 28.7% | 32.1% |
| > 1000 | 7-12 mos | 32.7% | 40.5% | |
| | 12-36 mos | 32.1% | 34.6% | |
| | 36+ mos | 30.3% | 34.5% | |

FIG. 8

METHOD AND SYSTEM FOR ENHANCING MODELING FOR CREDIT RISK SCORES

CLAIM OF PRIORITY

The present application claims priority to U.S. Provisional Patent Application No. 62/485,585, filed Apr. 14, 2017, and entitled "Methods and Systems for Expanding Modeling for Credit Risk Scores", the disclosure of which is incorporated herein by reference thereto.

FIELD OF THE INVENTION

The present invention generally relates to a method and system for generating credit risk scores.

BACKGROUND OF THE INVENTION

In the context of credit scoring, Credit Reporting Agencies (CRAs) utilize various methods to identify individuals and their credit risk. Typically, CRAs will base individuals' credit risk on credit scores that reflect the propensity of an individual to experience a specific type of failure mode, such as bankruptcy or default. The CRAs generate the credit scores by using various known techniques (e.g., marginal variable risk profiling) to identify attributes/variables that impact the credit risk of an individual. Once the attributes are developed, the CRAs will then apply conventional score modeling (e.g. Logistic Regression modeling to score the probability of default) that generates credit scores using data associated with the attributes/variables for each individual.

However, traditional credit score generation has limitations. For example, many CRAs scoring models have not adjusted to the modern developments in computing and analytics and are antiquated, focusing on attributes that are no longer indicative of an individual's propensity to pay off her debt. In addition, the standard CRA scoring models use many of the same standard performance definitions. Standard performance definitions within the credit scoring field utilize a long term projection (e.g., 2 years) on consumer payment or default and typically require default (or bad risk) to be multiple missed payments (e.g., at least ninety days past due or three months of missed payments) to determine risk. The use of standard performance definitions can lead to additional problems. For example, the amount of data available for standard performance definitions may be very limited for individuals who have never previously had credit, or have not opened any trades over the two year period. In other instances, the traditional data available can be outdated. Also, there are some instances where data is plentiful for individuals, but the data does not correspond to the attributes of the traditional scoring models. In addition, many scoring models are based upon old attributes that do not capture current consumer behavior adequately. For example, while most development in the credit scoring industry has relied on standard definitions built in the early years of credit scoring, the development has ignored or failed to capture the technological improvements in financial services (e.g. online billing, account management, access to credit, etc.) which have impacted consumers' behaviors in the credit.

Therefore, there is a need for a system that addresses these shortcomings to provide accurate credit scoring models that can utilize non-traditional definitions from underserved segments of the consumer population.

SUMMARY OF THE INVENTION

System and methods consistent with the present invention, as embodied and broadly described herein, expand/enhance modeling for credit risks scores. The expanded modeling system and methods discussed herein identify new credit risk related attributes using limited and/or unconventional credit data. In an aspect, the system and method enhance performance definitions to capture incremental insight, expanding the applicable consumer segments previously inaccessible.

In an aspect, the expanding modeling system can utilize machine learning methods to develop and identify more effective attributes after enhancing the performance definitions. In an aspect, the expanding modeling system and methods can then combine the new attributes to develop new scoring models. In other aspects, the new attributes can be used with incremental performance to develop the new scoring models. For example, alternate performance definitions can be considered to address short term credit usage patterns, new attributes can be developed via machine learning techniques to tailor risk profiles to the consumers' credit usages.

Additional advantages will be set forth in part in the description which follows or may be learned by practice. Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE FIGURES

FIG. 3 is a table illustrating an example of available trades according to an aspect of the present invention.

FIG. 8 illustrates the conversion of high performance nodes to attribute format according to an aspect of the present invention.

DETAILED DESCRIPTION OF THE INVENTION

Figure 1:
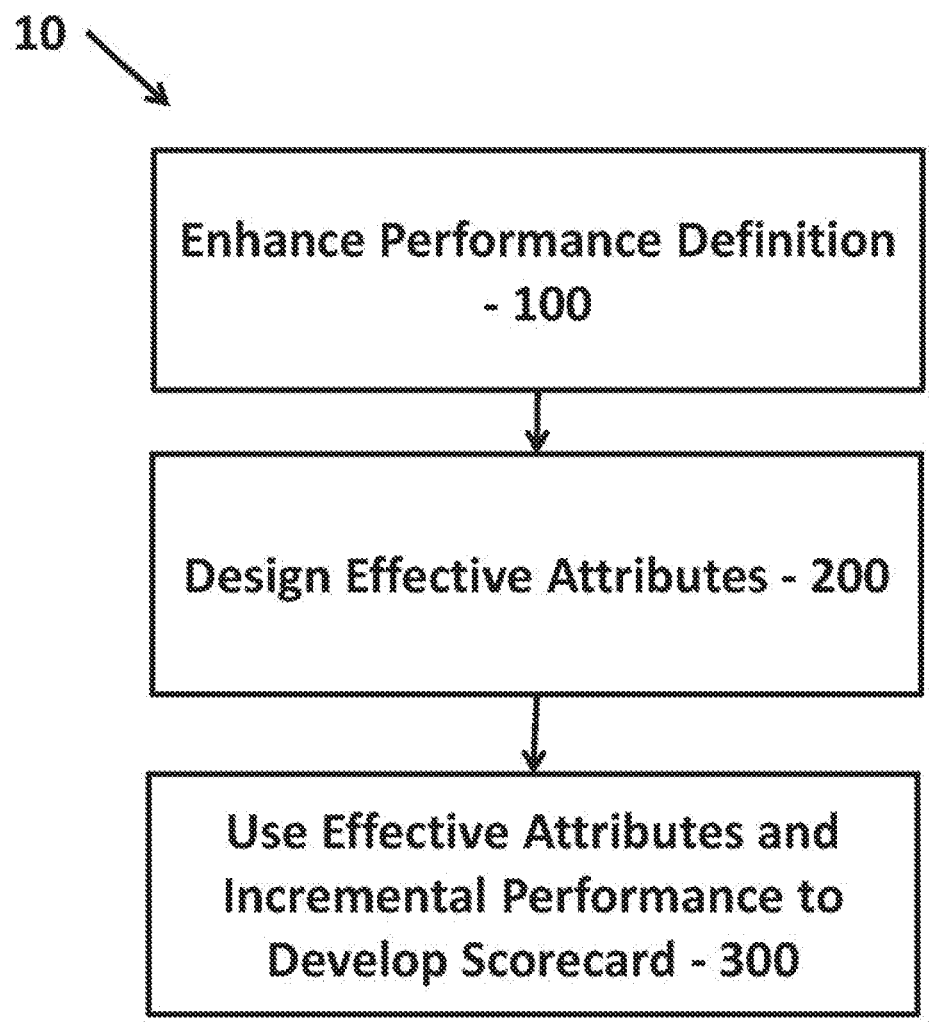
FIG. 1 is a flow chart illustrating a method of developing a scorecard process according to an aspect of the present invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed systems and methods. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all systems and methods. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

Disclosed are a method and system for expansion of modeling for credit risks scores. FIG. 1 illustrates a method 10 of expanding modeling for credit risk according to an aspect. The method 10 includes enhancing performance definition (100), designing effective attributes from the enhance performance definition (200), and then using the effective attributes and incremental performance to develop a new scorecard/model for generating credit risk scores (300).

Figure 2:
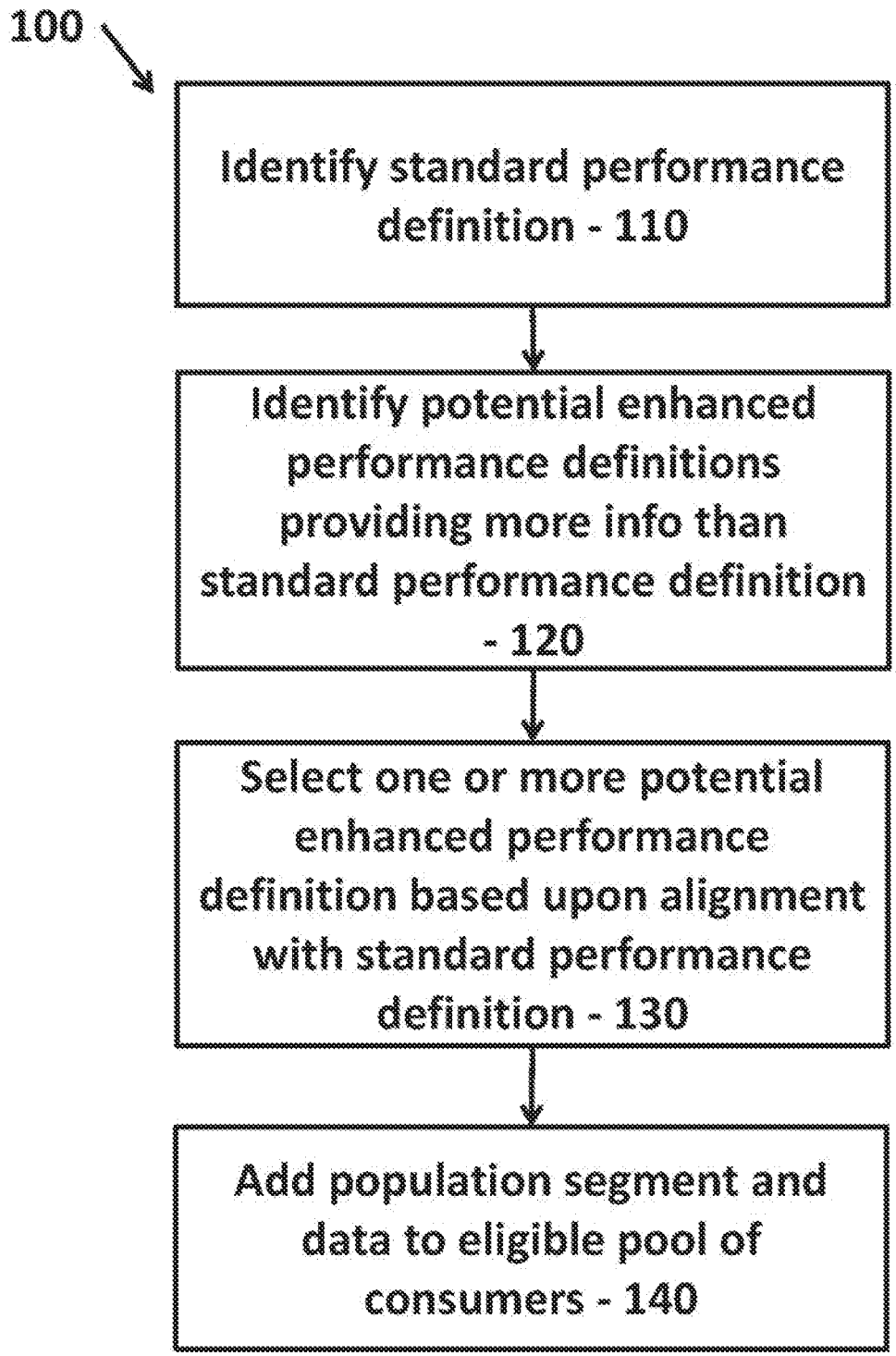
FIG. 2 is a flow chart illustrating a sub-step of the method of FIG. 1.

As shown in FIG. 2, enhancing the performance enhancing definition (step 100) includes identifying the standard performance definition (step 110), identifying potential enhanced performance definitions that provide more performance data/information than the standard performance definition (step 120), then selecting one or more of the potential enhanced performance definitions based upon each potential definition that align closely with the standard performance definition based upon the bad rates (i.e., the probability of default of payment) of each (step 130), and adding the additional population segment and their data to the eligible pool of consumers (140). In an aspect, the enhancing performance definition step (100) is done to capture incremental insight that cannot be identified using standard performance definitions. In an aspect, incremental insight is more performance-based exposure to a population considered limited through lack of recorded performance (e.g., not a twenty four month window) and credit report information inaccessible using conventional attribute design (e.g., analyzing credit information in current attribute formats lead to large quantities of consumers being analyzed in the same category, thus unable to distinguish risk profiles since all consumers look the same).

Enhancing the performance definition allows for the population under study to be accurately assessed by accessing a larger population of consumers (i.e. when compared to the limited population size using standard performance definitions). This allows for more information/data to be considered when defining risk profiles (i.e. attribute design). Moreover, enhancing the performance definition such that it can be aligned with the standard definition allows for the model to be incorporated in standard scorecard methodology.

The first step of enhancing performance definition (100) is to identify the standard performance definitions (110). Such standard performance definitions include, but are not limited to evidence that the consumer has defaulted on one or more of their trades over the last two years for trades that are at least two years old or evidence that the consumer has defaulted on one or more of their trades over the last 21 months for trades that were opened in the first three months of the performance window. As discussed previously, fewer people have credit risks scores generated because many standard performance definitions require performance data not available to such people. Many individuals have never pursued credit, or if they have obtained credit, have not built up enough of a credit history for standard performance definitions to apply. For example, one standard performance definition used by CRAs is the 90+dpd; Individuals having trades/transactions over an extended period of time (e.g., two years) that have not been paid within 90 days of the due date is a performance definition that indicates that an individual is a greater credit risk. However, the pool of consumers that have sufficient data available to indicate such a risk is only a fraction of the amount of consumers with available trades. For example, over 83% of consumers have performance trades within the last six months of the performance window, and over 92% of consumers have a trade opened within a 24 month performance window (e.g., time period identified for performance activity). Therefore, potential enhanced performance definitions should be identified that increase the pool of consumers for which data is available, as well as additional data (step 120).

FIG. 3 illustrates a table showing available trades for new entrants into the credit market over a period over the entire performance window of twenty-four months, including those that have just opened trades. By evaluating performance within the entire 24 month performance window, additional data of additional individuals can be used to help identify potential enhanced performance definitions (step 120). Potential enhanced performance definitions shown in FIG. 2 include 30+dpd, current trades, 60+dpd, 120+dpd, etc. Given that 90+dpd is a standard performance definition, anything past this has even more limited data available, leaving current, 30+dpd and 60+dpd as the potential enhanced performance definitions (step 120). Performance definitions could further be considered at an industry specific level, where the definition of default may vary by industry. For example, the mortgage definition of default may be 60+dpd whilst a revolving credit definition is 90+dpd.

Figure 4:
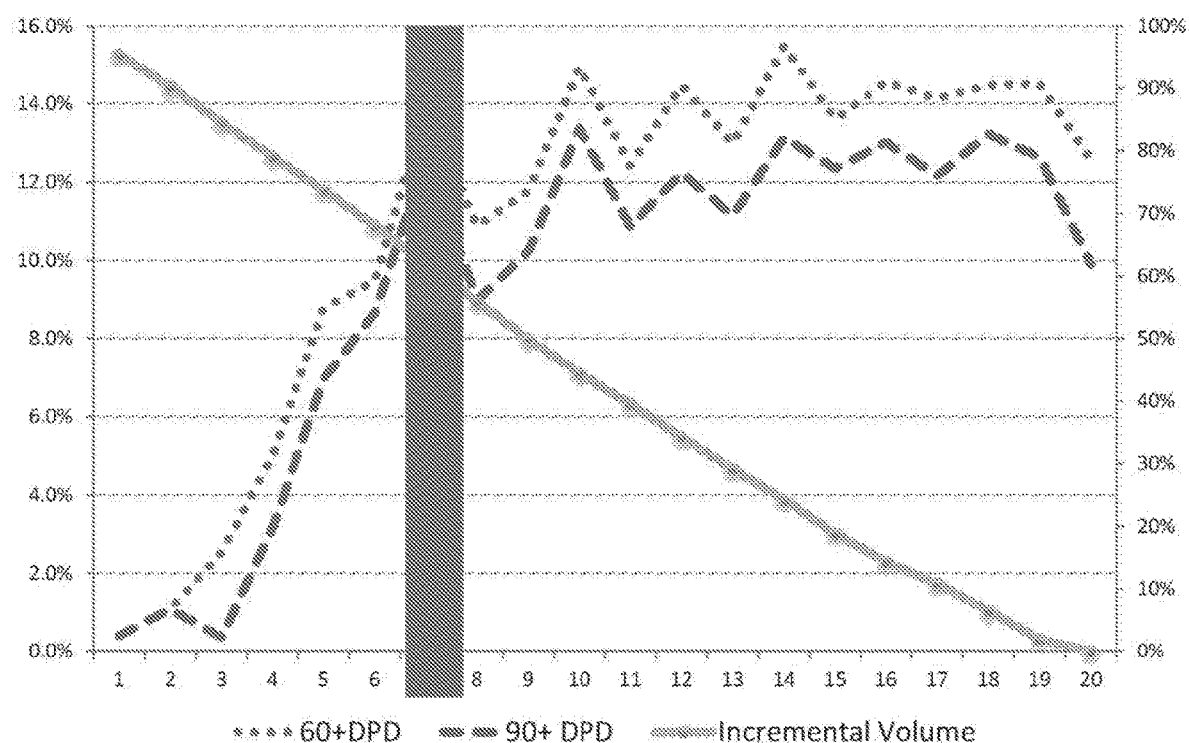
FIG. 4 is a chart illustrating calibrating a standard performance definition to an enhanced performance definition using bad rates according to an aspect of the present invention.

Once the potential enhanced performance definitions have been identified, the system and method find an enhanced performance definition that has bad rates that highly align or normalize with the standard performance definition (step 130). FIG. 4 illustrates the bad rates (i.e., percentage of default rate (default is generated by the credit issuer and reported to a CRA when a consumer fails to pay a trade), along the left vertical axis) of the 60+dpd and 90+dpd across a twenty month time period. As shown, the bad rate of the 60+dpd begins to stabilize and become aligned or normalized with the bad rate of the 90+dpd at the 7 month mark. In an aspect, the normalization/stabilization is determined by how quickly the graph peaks then flattens after the time period. As shown, the rates "grow" the first six months then stabilize or flatten afterwards meaning consumers are behaving. For this specific sub-population, the rates stabilize after 7 months, which means approximately 62% of available performance candidates can be added to the eligible volume, increasing the number of individuals and data as well. Eligible enhanced performance definitions that are determined must be developed and evaluated for every unique sub-population.

Figure 5:
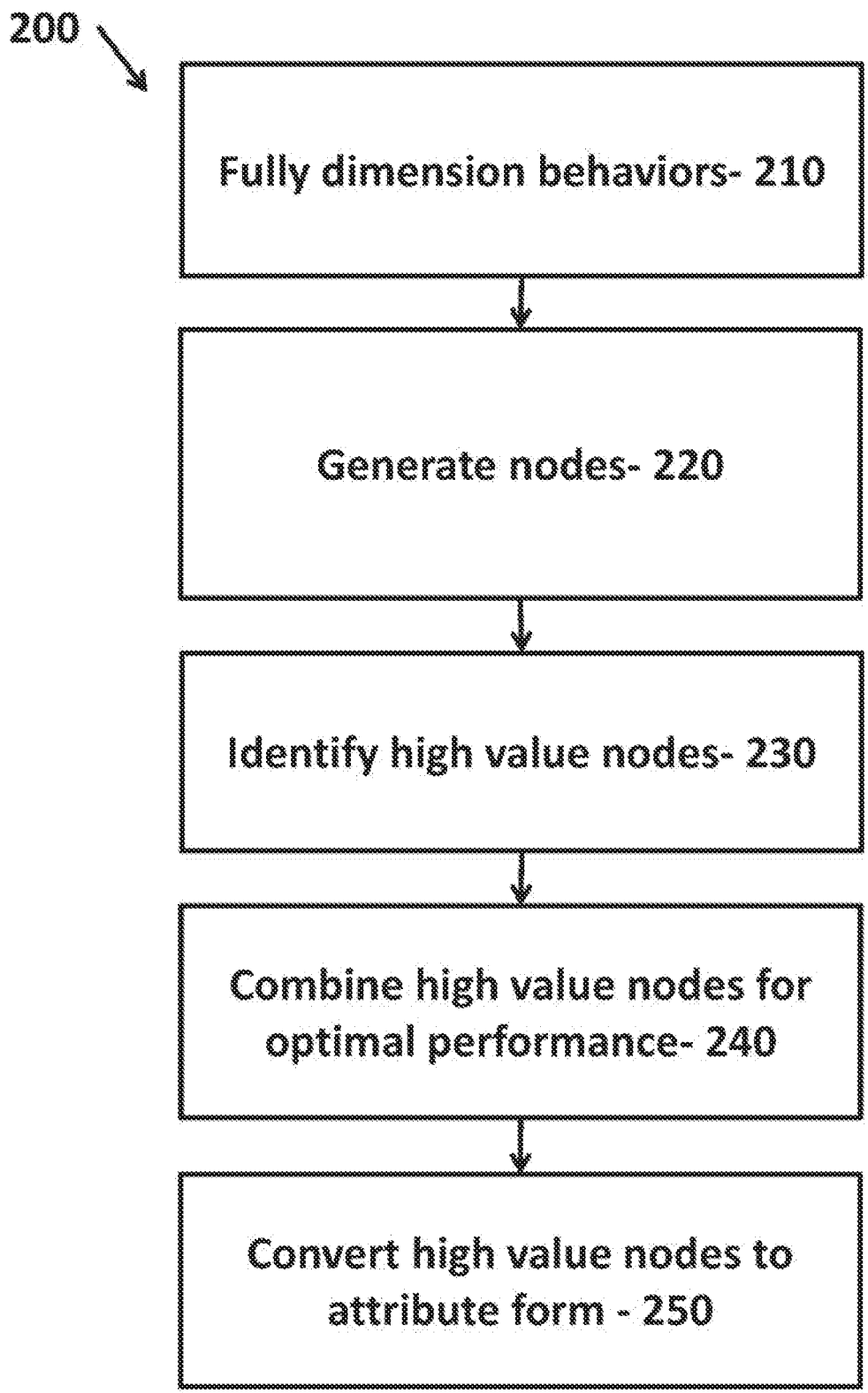
FIG. 5 is a flow chart illustrating a sub-step of the method of FIG. 1.

After the enhanced performance definition has been identified and the additional pool of consumers has been added (see step 100 in general), the system will then turn to design more effective attributes (step 200). As shown in FIG. 5, designing more effective attributes includes fully dimensioning behaviors for the relevant data categories of the population segment (step 210), generating risk nodes from a random set of the consumers (step 220), identifying high value nodes (step 230), combining the high value nodes to understand optimal performance (240), and then to convert high performance nodes to conventional attribute format (step 250).

Figure 6A:
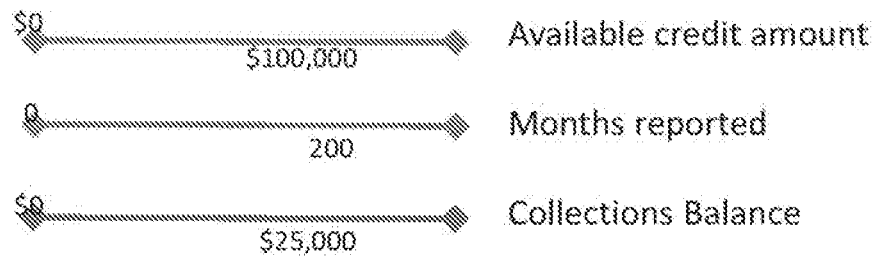
FIG. 6*a* illustrates an example of dimension behaviors for relevant data categories according to an aspect of the present invention.

The first sub-step of designing more effective attributes is to fully dimension credit management behaviors for relevant data categories (step 210). To fully dimension, the system leverages all available information in a credit file for each behavior. Attributes are not built at this point, but the system is attempting to use all available data to consider risk. The method/system can fully dimension the behaviors by examining the credit files of the population segment and identifying relevant data categories (e.g., credit limits, trade types, age of credit, historical payment information, open or closed credit, etc.), and provide the full behavioral dimensions (i.e., complete range of data for the behavior). For example, FIG. 6a show three fully dimensioned behaviors: available credit amount ranging from 0 to $100,000; months reported ranging from 0 to 200 months; and collections balance ranging from 0 to $25,000. Various other behavioral dimensions can be collected and selected from the credit files of the consumer segment. Additional behavioral dimensions include, but are not limited to, different types of collection balances (e.g., medical v. non-medical), inquires, trades, collections, public records, and combinations of trade types (e.g., credit cards/auto loans/personal loans/student loans/department store cards/mortgages, etc.) with data about the types (balances/worst ever status/credit limits/last reported dates/opened/closed/open dates/etc.), and the like. In an aspect, there are on average 100 dimensions within a credit file.

Once the behaviors are fully dimensioned (step 210), the method/system will use a statistical technique to generate risk nodes from the behavioral dimensions (step 220). In an aspect, the statistical technique is bootstrapping. In an aspect, bootstrapping is a statistical technique where the system selects one dimension (at random) repeatedly to allow the system to assess the predictive power of the one dimension in multiple settings (i.e. in combination with other dimensions) in order to find out which combination provides a superior risk prediction. In other words, machine learning methods are used to build relationships between the data available on the behavioral dimensions. The modeling determines the interaction and relationships between the fully dimensioned behaviors and identifies the combination of behaviors/dimensions that are predictive.

Figure 6B:
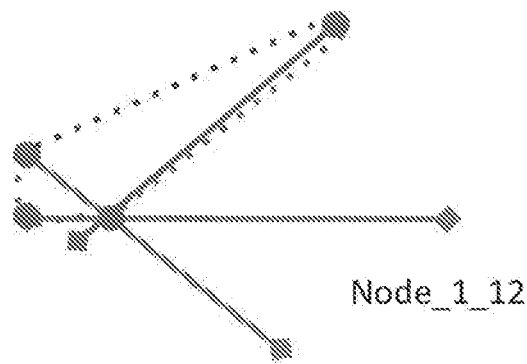
FIG. 6*b* illustrates a node created from the shown dimension behaviors of FIG. 6*a* according to an aspect of the present invention.

In an aspect, the system will randomly select behavioral dimensions from a random set of consumers of the population segment. Once selected, the system will then subject the selected dimensions to modeling (e.g., bootstrapping, random forest trees, etc.) to generate nodes. Nodes are predictors from decision trees (a random forest is a set of decision trees) and created by splitting data into groups (the decision tree) to identify data decisions maximizing the separation of the risk predictor (typically good versus bad). The node will be a group of consumers with the "same" information, but separating a group to identify good v. bad behavior. The random forest trees will determine performance separation (e.g., good-bad (i.e., failure to pay v. receive payment)) at each node. In an exemplary aspect the system will create roughly 300 to 500 trees, with 30,000 to 50,000 nodes being generated. FIG. 6B illustrates an example of a node that has used the fully dimension behaviors illustrated in FIG. 6A. In an aspect, the node is formed by the intersection of the dimensions considered. Node_1_12 generates a chance of a default of approximately 26.3% (i.e. Bad Rate) and a chance of payment being received of approximately 73.7% (i.e., Good Rate) if the following occurs:

If COLLEXT BAL is greater than or equal to 0 and is less than 88 and MONTHS REPORTED is greater than or equal to 5 and is less than or equal to 11 and AVAILABLE CREDIT AMT is greater than or equal to 0 and is less than 500.

In addition, to reduce redundancy and poor performance, criteria can be applied to the random forest trees. For example, criteria can be the minimum or maximum size of the node, non-intuitive relationships between behavioral dimensions, repetitive use of a dimension. In an aspect, the system sets the criteria so that the trees create robust sets of information by requiring the node to have at least 1% of the population, ensuring statistical stability will be maintained to prevent small sets of consumers and cannot be repeatable.

This is also sensitivity analysis; the system wants to make sure that the behaviors being considered are strong signals about credit behavior and not small unexplainable nuance, which reduces overlapping redundant nodes, which can lead to over fitting and poorer performance. A novel feature of the above is that any random line from a consumer credit report can be selected to generate the relationships. A credit file is standardized, but the system can randomly select information since it is always the same format and no further work is required. Here, the random selection can then pull all the same information for each individual in the population segment to generate these trees and nodes.

Once the nodes have been generated (220), the next step is to identify the high value nodes (step 230). In an aspect, the identification of high value nodes is based upon identifying the nodes that identify strongly the behavior of the consumers; that is, the high value nodes are ones that generate the largest or smallest bad rates (i.e., evidence of default) for the consumers. The high value nodes are modeled and ranked to identify those nodes that give the largest separations of good and bad rates, where good rate is defined as a high percentage of consumers in the population that made payments on their trades, (sometimes very few bad rates, and other times very large bad rates), with both yielding high values since they separate good credit behavior versus bad.

Figure 7:
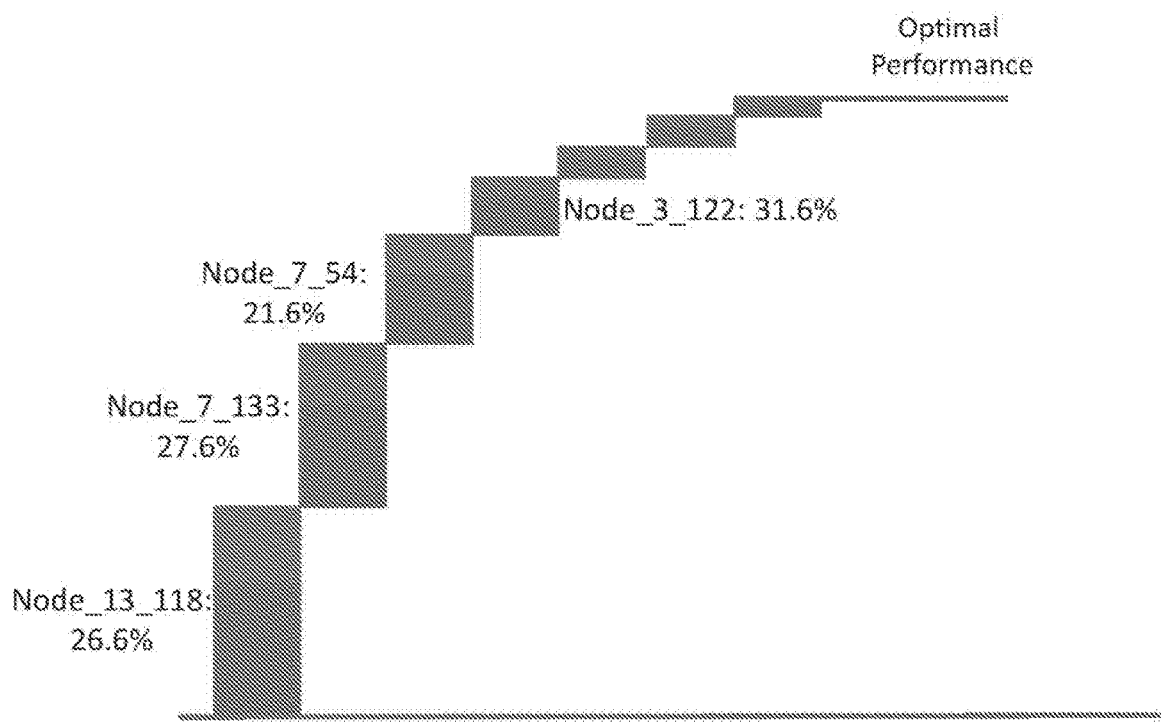
FIG. 7 illustrates a combination of high performance nodes according to an aspect of the present invention.

Once the high value nodes are identified, they are combined to deliver peak performance (step 240). In an aspect, the high value nodes are combined for maximum predictive power, which can be measured by standard statistical likelihood theory all possible nodes provide. Maximum separation is achieved by selecting high value nodes that include different ranges of data and behavioral dimensions from one another. FIG. 7 illustrates an example of a combination of four or more high value nodes delivering maximum separation, with incremental predictive lift based on statistical likelihood theory.

After the high value nodes have been selected and combined (step 240), the high value nodes are then converted to attribute format (step 250). The conversion includes combining the relevant nodes and the key behaviors to generate the attributes. In an aspect, this is done by evaluating all the data rules created by the decision tree (e.g. if trade=bankcard AND worst status is current (never missed payment) and age of trade >200 months AND credit limit is between 2000 and 5000), finding all the rules that use all of these dimensions, and then combining them to determine how many attributes can be created. In an aspect, the conversion is done with a secondary goal of minimizing performance loss. This can be done by testing multiple iterations to determine the best possible mix that retains the predictive power as measured through statistical likelihood methods.

In an aspect, not all nodes or all behaviors within a node are going to be incorporated into the attributes. For example, if the population of a node is too small, then it may not make sense to include it. FIG. 8 illustrates such a conversion. As shown, three high value nodes have been identified. The first node includes collection balance, months reported, and available credit amount. The second node includes a maximum rate, a collection balance, and a number of credit inquires. The third node includes max rate, collection balance, and number of credit inquires. These nodes then generate the following attributes: unpaid collections over six months due based upon amount of balance, the age of the account, and the number of inquiries.

After the attributes have been created (step 200), the system can then turn to develop a standard scorecard from the identified attributes and incremental performance (step 300). In an aspect, the system will use standard logistic regression techniques to develop the standard scorecard. In an aspect, the system will explore multi-dimension designs (e.g., via suggestions from the predictive nodes from the decision tree forest), creating multi-dimensional attributes. In an exemplary aspect, 8-10 multi-dimensional attributes are created. Further, the scorecards are designed to retain intuitive logic in order to produce adverse actions. In an aspect, once the attributes are created, they are assessed using the standard credit scoring method to produce logic and reasoning used in conventional score cards to develop adverse action language. In other words, in such aspects, attributes can be vetted so they are coded to produce the same forms as traditional credit logic.

Nodes may be combined to describe behaviors, typically for a single or primary trade such as revolving card, installment loan or mortgage. Nodes do not need to have the same dimensions, same number of dimensions, or the same number of behavioral ranges within each dimension. Once high value nodes for a particular product are identified and combined, they are converted to an attribute set comprising a primary attribute and a suite of secondary or nested attributes that can then be used in conventional scorecard development.

In an aspect, the primary attribute associated with the node is a presence of product flag. All other attributes representing the behavioral dimensions of the node may be nested within this product presence attribute and function in relation to the primary attribute. Default conditions are assigned at the level of this primary attribute.

Node design may include a number of behavioral dimensions associated with the product. For example, a node that incorporates three behaviors—balance, age and number of inquiries—has three dimensions. Each dimension may be further described by a set of behavioral ranges that monotonically define risk levels on each dimension. When designing and calibrating attributes for incorporation in a scorecard, all possible combinations of node dimensional ranges must, in one embodiment, be constructed for coefficient estimation within the calibration process. For example, if a node has three dimensions and there are three relevant behavioral ranges within each dimension, then twenty-seven attributes must be designed (in one embodiment). The twenty-seven attributes are mutually exclusive, contiguous and comprehensively represent all possible combinations of consumer behaviors on these dimensions.

A further consideration regarding the validity of a specific attribute is whether the combination of behaviors can be transparently explained to a consumer in accordance with adverse action principles. The inability to adequately explain how the attribute behavior impacted the consumer's credit score can invalidate an attribute entirely.

Having constructed the attributes, a standard logistic regression calibration process is used to determine coefficient values for each attribute. In one embodiment, monotonicity, statistical significance and valid reason code assignment must all be confirmed so that the attribute set can be included within the model.

Figure 9:
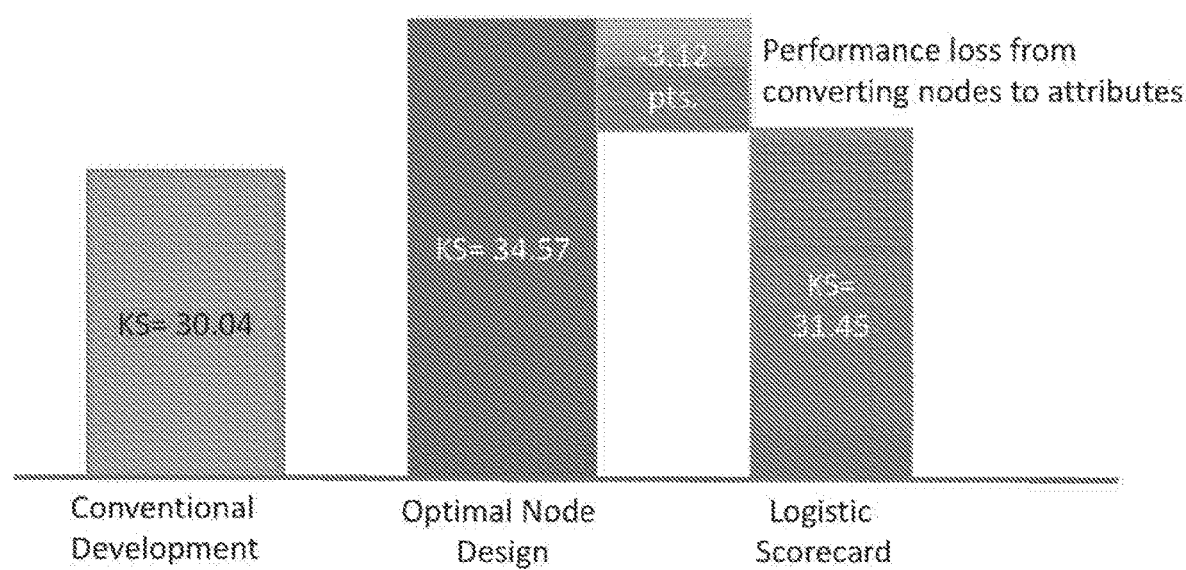
FIG. 9 is a graph comparing predictive performance of the various models according to an aspect of the present invention.

FIG. 9 shows the predictive performance of conventional development, optimal node design, and logistic scorecard using a KS statistic. As shown, while the logistic scorecard has a greater KS value than the conventional methods, there can be a significant performance loss due from converting the optimal node designs to the attributes used in the scorecard. The challenge in the conversion is to minimize the performance loss due to the attribute design. In an aspect, the suggestions for attributes from the decision tree nodes are tested to determine that they produce values similar to the original nodes.

Figure 10:
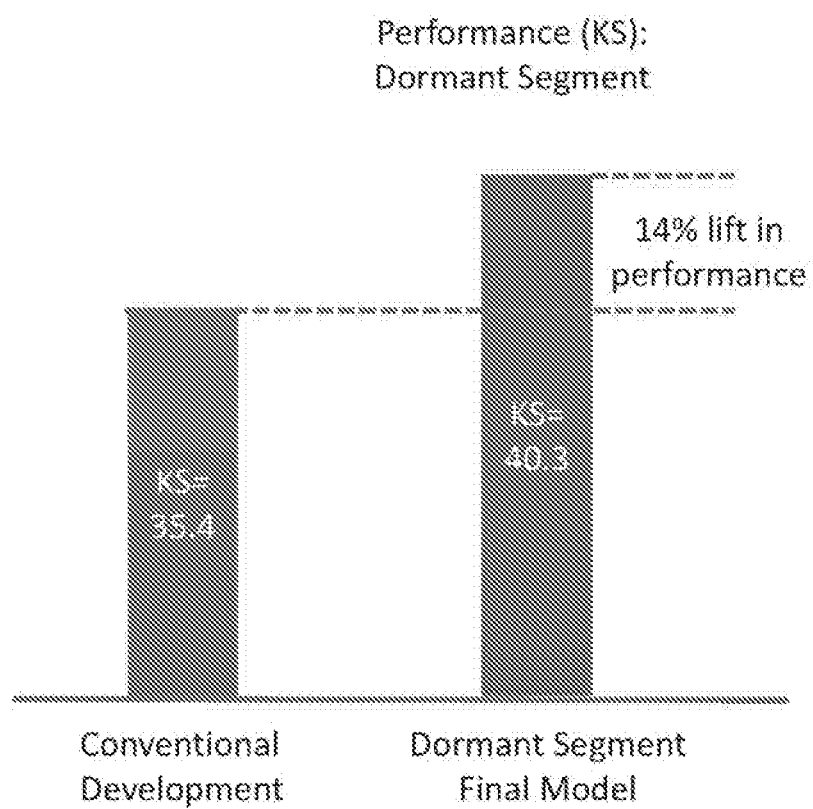
FIG. 10 is a graph illustrating the difference in performance between conventional modeling and the expansion modeling according to an aspect of the present invention.

By utilizing the system and methods above, credit risk scoring can be universally expanded, using additional information and scoring consumers that previous were unavailable due to a lack of data. In an aspect, the methods allow scoring to expand homogeneous segments, which include, but are not limited to, new entrants, dormant (see FIG. 10), and consumers with no trades. In one embodiment, this could be applied to any population of homogeneous consumers, not just sparse segments. In addition, the method allows attributes to be designed for, but not limited to, revolving products, inquires, installment products, collections, payment history, and public records.

Figure 11:
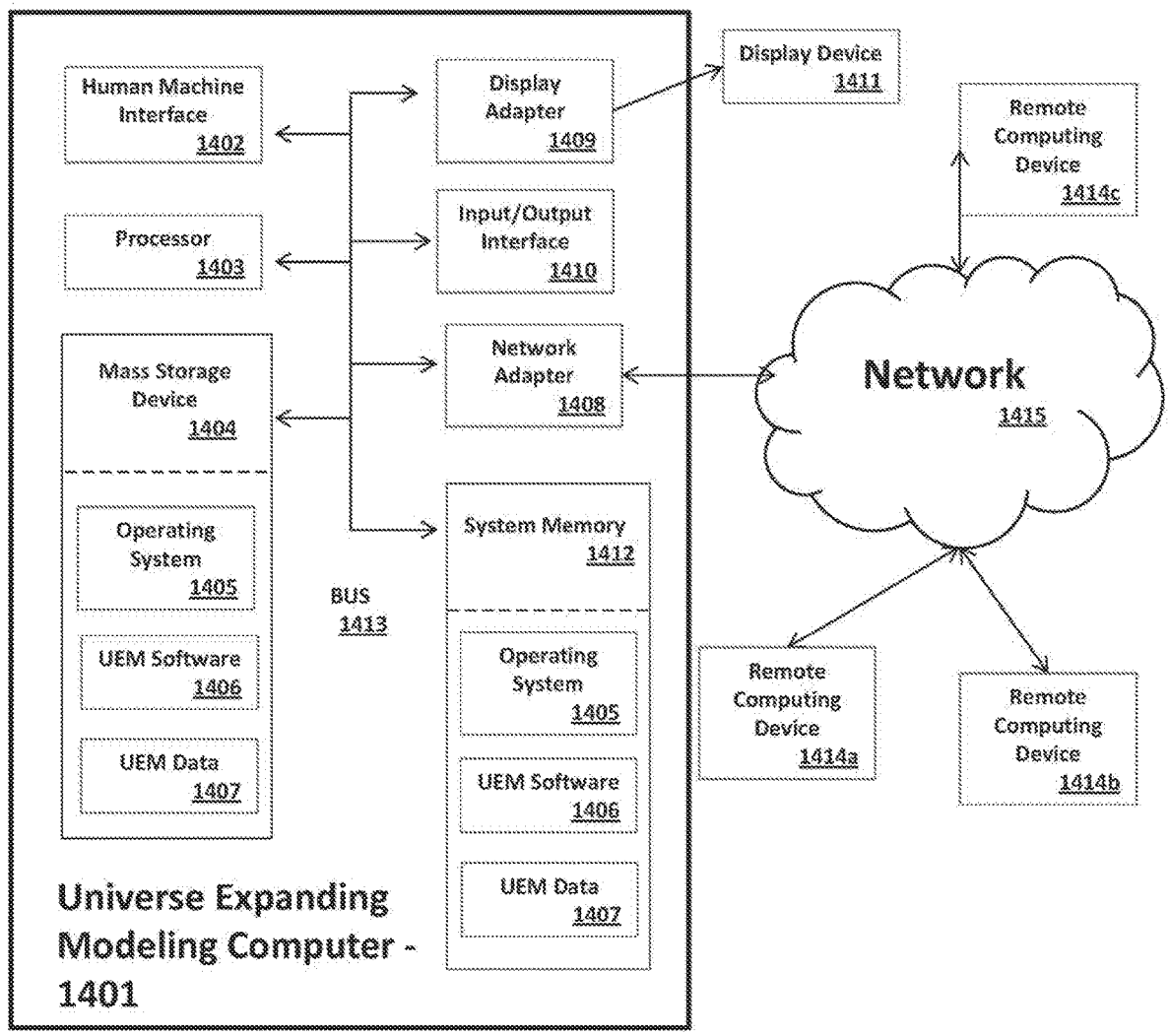
FIG. 11 is a block diagram of a computer according to an aspect of the present invention.

FIG. 11 is a block diagram illustrating an exemplary operating environment for performing a portion of disclosed methods according to an embodiment of the present invention. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Further, one skilled in the art will appreciate that the systems and methods disclosed herein can utilize a specialized computing device in the form of a universe expanding modeling computer 1401. The methods discussed above can be performed by the computer 1401. For example, the universe expanding modeling computer 1401 can perform the duties and responsibilities discussed above.

The components of the universe expanding modeling computer 1401 can comprise, but are not limited to, one or more processors or processing units 1403, a system memory 1412, and a system bus 1413 that couples various system components including the processor 1403 to the system memory 1412. In the case of multiple processing units 1403, the system can utilize parallel computing.

The system bus 1413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1413, and all buses specified in this description can also be implemented over a wired or wireless network connection and each of the subsystems, including the processor 1403, a mass storage device 1404, an operating system 1405, universe expanding modeling (UEM) software 1406, UEM data 1407, a network adapter 1408, system memory 1412, an Input/Output Interface 1410, a display adapter 1409, a display device 1411, and a human machine interface 1402, can be contained within one or more remote computing devices 1414a,b,c at physically separate locations, connected through buses of this form, in effect implementing a fully distributed system.

The universe expanding modeling computer 1401 typically comprises a variety of computer readable media. Exemplary readable media can be any available media that is accessible by the universe expanding modeling computer 1401 and comprises, for example and not meant to be limiting, both volatile and non-volatile media, removable and non-removable media. The system memory 1412 comprises computer readable media in the form of volatile memory, such as random access memory (RAM), and/or non-volatile memory, such as read only memory (ROM). The system memory 1412 typically contains data such as UEM data 1407 and/or program modules such as operating system 1405 and UEM software 1406 (i.e., modules and the like that perform the methods discussed above) that are immediately accessible to and/or are presently operated on by the processing unit 1403.

In another aspect, the universe expanding modeling computer 1401 can also comprise other removable/non-removable, volatile/non-volatile computer storage media. By way of example, FIG. 11 illustrates a mass storage device 1404, which can provide non-volatile storage of computer code, computer readable instructions, data structures, program modules, and other data for the universe expanding modeling computer 1401. For example and not meant to be limiting, a mass storage device 1404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1404, including by way of example, an operating system 1405 and UEM software 1406. Each of the operating system 1405 and UEM software 1406 (or some combination thereof) can comprise elements of the programming and the UEM software 1406. UEM data 1407 can also be stored on the mass storage device 1404. UEM data 1407 can be stored in any of one or more databases known in the art. Examples of such databases include DB2®, Microsoft® Access, Microsoft® SQL Server, Oracle®, mySQL, PostgreSQL, and the like. The databases can be centralized or distributed across multiple systems. In other aspects, the UEM data 1407 can be stored on the mass storage device 1405 of other servers or devices (e.g., remote computing device 1414a,b,c,) in communication with the universe expanding modeling computer 1401.

In another aspect, the user can enter commands and information into the universe expanding modeling computer 1401 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 1403 via a human machine interface 1402 that is coupled to the system bus 1413, but can be connected by other interface and bus structures, such as a parallel port, game port, an IEEE 1394 Port (also known as a Firewire port), a serial port, or a universal serial bus (USB).

In yet another aspect, a display device 1411 can also be connected to the system bus 1413 via an interface, such as a display adapter 1409. It is contemplated that the universe expanding modeling computer 1401 can have more than one display adapter 1409 and more than one display device 1411. For example, a display device can be a monitor, an LCD (Liquid Crystal Display), or a projector. In addition to the display device 1411, other output peripheral devices can comprise components such as speakers (not shown) and a printer (not shown) which can be connected to the computer 1401 via Input/Output Interface 1410. Any step and/or result of the methods can be output in any form to an output device. Such output can be any form of visual representation, including, but not limited to, textual, graphical, animation, audio, tactile, and the like.

The universe expanding modeling computer 1401 can operate in a networked environment using logical connections to one or more remote computing devices 1414a,b,c. By way of example, a remote computing device can be a personal computer, a laptop computer, portable computer, a server, a router, a network computer, a peer device or other common network node, and so on. Logical connections between the universe expanding modeling computer 1401 and a remote computing device 1414a,b,c can be made via a local area network (LAN) and a general wide area network (WAN). Such network connections can be through a network adapter 1408. A network adapter 1408 can be implemented in both wired and wireless environments. Such networking environments are conventional and commonplace in offices, enterprise-wide computer networks, intranets, and the Internet 1415.

For purposes of illustration, application programs and other executable program components such as the operating system 1405 are illustrated herein as discrete blocks, although it is recognized that such programs and components reside at various times in different storage components of the universe expanding modeling computer 1401, and are executed by the data processor(s) of the computer. An implementation of UEM software 1406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While several illustrative embodiments of the invention have been shown and described, numerous variations and alternative embodiments will occur to those skilled in the art. Such variations and alternative embodiments are contemplated, and can be made without departing from the spirit and scope of the invention as discussed above and defined in the appended claims.

What is claimed is:

1. A computer-implemented method for enhancing modeling for credit risk scores, comprising:
   a. identifying and selecting an enhanced performance definition that aligns with a standard performance definition associated with a pool of consumers, such that there is an expanded pool of consumers associated with the enhanced performance definition, comprising:
      i. identifying the standard performance definition, associated with the pool of consumers;
      ii. identifying a plurality of potential enhanced performance definitions which provide more information than the standard performance definition;
      iii. selecting the enhanced performance definition from the plurality of potential enhanced performance definitions, the enhanced performance definition aligning with the standard performance definition; and
      iv. adding a population segment, associated with the enhanced performance definition, to the pool of consumers, thereby creating an expanded pool of consumers;
   b. defining effective attributes, comprising:
      i. fully dimensioning behaviors from relevant data categories from the expanded pool of consumers by:
         A. leveraging all available information in a credit file for each of the consumers;
         B. identifying relevant data categories; and
         C. providing data from the identified relevant data categories for the dimensioned behaviors;
      ii. generating risk nodes based on combinations from the fully dimensioned behaviors from the expanded pool of consumers using machine learning methods utilizing statistical techniques of bootstrapping;
      iii. identifying higher value nodes of the generated risk nodes; and
      iv. converting the identified higher value nodes to attributes;
   c. generating a scoring model to produce a standard scorecard based on the converted attributes, wherein the standard scorecard generates credit risk scores that are applicable to the expanded pool of consumers; and
   d. utilizing machine learning methods to update the scoring model to optimize performance.

2. The method of claim 1, wherein the risk nodes generating step performs the steps of:
   i. identifying ranges of data in the relevant categories from the credit file for the expanded pool of consumers;
   ii. generating risk nodes based on the identified ranges of data;
   iii. identifying higher value nodes of the generated risk nodes; and
   iv. combining the identified higher value nodes to achieve maximum predictive power.

3. The method of claim 1, wherein the risk nodes generating step further comprises applying criteria to generate the risk nodes.

4. The method of claim 1, wherein the risk nodes generating step further includes selecting randomly one relevant category and corresponding identified ranges of data and then generating risk nodes utilizing the at least randomly selected category.

5. The method of claim 1, wherein the identifying higher value nodes step includes identifying the nodes that give the largest separation of good and bad rates.

6. The method of claim 5, further comprising combining the identified higher value nodes to achieve maximum predictive power.

7. The method of claim 6, wherein maximum predictive power is achieved by selecting higher value nodes that include different ranges of data and behavioral dimensions from one another.

8. The method of claim 1, wherein the converting step comprises combining the identified higher value nodes and key behaviors to generate the attributes.

9. The method of claim 8, wherein the attributes represent each behavior and each dimension of each behavior.

10. The method of claim 9, further comprising eliminating attributes that are invalid.

11. A system for enhancing modeling for credit risk scores, comprising:
- a memory for storing a standard performance definition associated with a pod of consumers; and
- a processor for performing the steps of:
  - a. identifying and selecting an enhanced performance definition that aligns with the standard performance definition, such that there is an expanded pool of consumers associated with the enhanced performance definition, comprising:
    - i. identifying the standard performance definition, associated with the pool of consumers;
    - ii. identifying a plurality of potential enhanced performance definitions which provide more information than the standard performance definition;
    - iii. selecting the enhanced performance definition from the plurality of potential enhanced performance definitions, the enhanced performance definition aligning with the standard performance definition; and
    - iv. adding a population segment, associated with the enhanced performance definition, to the pool of consumers, thereby creating an expanded pool of consumers;
  - b. defining effective attributes, comprising:
    - i. fully dimensioning behaviors from relevant data categories from the expanded pool of consumers by:
      - A. leveraging all available information in a credit for each of the consumers:
      - B. identifying relevant data categories; and
      - C. providing data from the identified relevant data categories for the dimensioned behaviors;
    - ii. generating risk nodes based on combinations from the fully dimensioned behaviors from the expanded pool of consumers using machine learning methods utilizing statistical techniques of bootstrapping;
    - iii. identifying higher value nodes of the generated risk nodes; and
    - iv. converting the identified higher value nodes to attributes;
  - c. generating a scoring model to produce a standard scorecard based on the converted attributes, wherein the standard scorecard generates credit risk scores that are applicable to the expanded pool of consumers; and
  - d. utilizing machine learning methods to update the scoring model to optimize performance.

12. The system of claim 11, wherein the processor performs the risk nodes generating step by:
  - i. identifying ranges of data in the relevant categories from the credit files, for the expanded pool of consumers; and
  - ii. generating risk nodes based on the identified ranges of data;
  - iii. identifying higher value nodes of the generated risk nodes; and
  - iv. combining the identified higher value nodes to achieve maximum predictive power.

13. The system of claim 11, wherein the risk nodes generating step performed by the processor further comprises applying criteria to generate the risk nodes.

14. The system of claim 11, wherein the risk nodes generating step performed by the processor further includes selecting randomly one relevant category and corresponding identified ranges of data and then generating risk nodes utilizing the at least randomly selected category.

15. The system of claim 11, wherein the identifying higher value nodes step performed by the processor includes identifying the nodes that give the largest separation of good and bad rates.

16. The system of claim 15, wherein the processor is further configured to performing the step of combining the identified higher value nodes to achieve maximum predictive power.

17. The system of claim 16, wherein maximum predictive power is achieved by selecting higher value nodes that include different ranges of data and behavioral dimensions from one another.

18. The system of claim 11, wherein the converting step performed by the processor comprises combining the identified higher value nodes and key behaviors to generate the attributes.

19. The system of claim 18, wherein the attributes represent each behavior and each dimension of each behavior.

20. The system of claim 19, wherein the processor further comprising the step of eliminating attributes that are invalid.

21. A non-transitory computer readable medium with computer executable instructions embodied thereon for enhancing modeling for credit risk score, the computer executable instructions causing a computer to perform the process of:
  - a. identifying and selecting an enhanced performance definition that aligns with a standard performance definition associated with a pool of consumers, such that there is an expanded pool of consumers associated with the enhanced performance definition, comprising:
    - i. identifying the standard performance definition, associated with the pool of consumers;
    - ii. identifying a plurality of potential enhanced performance definitions which provide more information than the standard performance definition;
    - iii. selecting the enhanced performance definition from the plurality of potential enhanced performance definitions, the enhanced performance definition aligning with the standard performance definition; and
    - iv. adding a population segment, associated with the enhanced performance definition, to the pool of consumers, thereby creating an expanded pool of consumers;
  - b. defining effective attributes, comprising:
    - i. fully dimensioning behaviors from relevant data categories from the expanded pool of consumers by:
      - A. leveraging all available information in a credit file for each of the consumers;
      - B. identifying relevant data categories; and
      - C. providing data from the identified relevant data categories far the dimensioned behaviors;
    - ii. generating risk nodes based on combinations from the fully dimensioned behaviors from the expanded pool of consumers using machine learning methods utilizing statistical techniques of bootstrapping;
    - iii. identifying higher value nodes of the generated risk nodes; and
    - iv. converting the identified higher value nodes to attributes;
  - c. generating a scoring model to produce a standard scorecard based on the converted attributes, wherein the standard scorecard generates credit risk scores that are applicable to the expanded pool of consumers; and
  - d. utilizing machine learning methods to update the scoring model to optimize performance.

* * * * *